(12) United States Patent
Reddy et al.

(10) Patent No.: US 11,831,946 B2
(45) Date of Patent: Nov. 28, 2023

(54) AUDIO ONLY PLAYBACK FROM STB IN STANDBY MODE

(71) Applicant: ARRIS Enterprises LLC, Suwanee, GA (US)

(72) Inventors: Nethravathi Reddy, Karnataka (IN); Sathish Kumar Mani, Karnataka (IN); Pavan Kumar Addepalli, Karnataka (IN)

(73) Assignee: ARRIS Enterprises LLC, Suwanee, GA (US)

(*) Notice: Subject to any disclaimer, the term of this patent is extended or adjusted under 35 U.S.C. 154(b) by 0 days.

(21) Appl. No.: 17/591,708

(22) Filed: Feb. 3, 2022

(65) Prior Publication Data

US 2022/0303612 A1 Sep. 22, 2022

Related U.S. Application Data (60) Provisional application No. 63/162,167, filed on Mar. 17, 2021.

(51) Int. Cl.
| | |
|---|---|
| *H04N 21/439* | (2011.01) |
| *G10L 19/16* | (2013.01) |
| *G10L 15/26* | (2006.01) |
| *H04N 21/443* | (2011.01) |
| *G10L 15/22* | (2006.01) |

(52) U.S. Cl.
CPC ........ *H04N 21/439* (2013.01); *G10L 15/22* (2013.01); *G10L 15/26* (2013.01); *G10L 19/167* (2013.01); *H04N 21/4436* (2013.01); *G10L 2015/223* (2013.01)

(58) Field of Classification Search
None
See application file for complete search history.

(56) References Cited

U.S. PATENT DOCUMENTS

| | | | |
|---|---|---|---|
| 10,271,093 B1* | 4/2019 | Jobanputra | .......... H04N 21/835 |
| 2005/0289624 A1 | 12/2005 | Shin | |
| 2009/0316796 A1* | 12/2009 | Taleb | ................ H04N 21/4435 |
| | | | 375/E7.027 |

(Continued)

FOREIGN PATENT DOCUMENTS

| | | |
|---|---|---|
| KR | 10-2004-0085335 A | 10/2004 |
| KR | 10-2016-0077284 A | 7/2016 |

OTHER PUBLICATIONS

Notification of Transmittal of the International Search Report (Forms PCT/ISA/220 and PCT/ISA/210) and the Written Opinion of the International Searching Authority (Form PCT/ISA/237) dated May 19, 2022, by the International Application Division Korean Intellectual Property Office in corresponding International Application No. PCT/US2022/015042. (9 pages).

*Primary Examiner* — Omar S Parra
(74) *Attorney, Agent, or Firm* — Panitch Schwarze Belisario & Nadel LLC (57) ABSTRACT

The present disclosure describes techniques for effectively utilizing a standby mode of a set top box (STB). The techniques according to the present disclosure comprise detecting a standby mode of the STB and in response to detecting the standby mode of the STB, selectively toggling an audio decoder of the STB to an ON state or selectively maintaining an ON state of the audio decoder. Accordingly, the techniques according to the present disclosure enable audio only playback from the STB in the standby mode.

22 Claims, 6 Drawing Sheets

(56) References Cited

U.S. PATENT DOCUMENTS

2015/0350773 A1* 12/2015 Yang ................ H04N 21/44227
381/77
2019/0387192 A1 12/2019 Fang
2020/0380981 A1 12/2020 Tom

* cited by examiner

AUDIO ONLY PLAYBACK FROM STB IN STANDBY MODE

TECHNICAL FIELD

The present disclosure in general relates to a set top box. More particularly, but not exclusively, to techniques for operating the set top box in a standby mode.

BACKGROUND

Technology is constantly advancing and the advances in the technology have resulted in more powerful devices. Over the time with technological advancement, as service providers added additional services (such as digital channels, satellite broadcast services, internet access), set top boxes (STBs) were introduced to support these additional services brought about by the technological advancement. A set top box (STB) is a device which serves as a connecting link between an audiovisual device such as a television set (TV) and an external broadcasting signal source.

Nowadays, set-top boxes with energy efficient standby mode have been developed. A STB may enter the standby mode to save power in various components of the STB. In the standby mode, the STB cannot decode any audio or video content because both audio and video decoders of the STB are turned off Therefore, even though there is power in the STB, still it cannot be used for any purpose. Thus, there exists a need for the technology to effectively utilize the standby mode of the STB.

Further, due to the technological advancement in recent years, there is a growing tendency for multi-purpose devices. A multi-purpose device is an all-in-one box that can do the same things as several different devices did before it. For example, a mobile phone in addition to its main purpose of calling can now perform additional functions such as taking photos, recording videos, accessing internet, playing back music and many more.

The STB is mainly used for the purpose of streaming audiovisual content on a connected audiovisual device. However, with the advancement of technology there is a need to transform the STB into a multi-purpose device, specifically, when the STB is in the standby mode. Nowadays, there is a high trend in assistant audio devices that receive commands from a user and return relevant information or perform specific functions as requested by the user. However, the user needs to either purchase such devices or depend on external solution providers, which is not feasible for all users.

Thus, there exists a need for the technology to transform the STB into a smart assistant device, particularly, when the STB is in the standby mode so that the standby mode can be effectively utilized and at the same time the user experience can be enhanced. However, the conventional technologies do not provide the techniques that can transform the STB into an assistant device while effectively utilizing the standby mode. In view of the foregoing, there exists a need in the art to provide a solution which overcomes the above-mentioned technical challenges.

The information disclosed in this background section is only for enhancement of understanding of the general background of the invention and should not be taken as an acknowledgement or any form of suggestion that this information forms the prior art already known to a person skilled in the art.

SUMMARY

An object of the present disclosure is to provide techniques for operating a set top box (STB) in a standby mode.

Another object of the present disclosure is to effectively utilize a standby mode of a set top box (STB) by leveraging the capabilities supported on the STB.

Yet another object of the present disclosure is to transform a set top box (STB) into a smart assistant device when the STB is in a standby mode to enhance the user experience.

The above stated objects as well as other objects, features, and advantages of the present disclosure will become clear to those skilled in the art upon review of the following description, the attached drawings, and the appended claims.

In one non-limiting embodiment of the present disclosure, a method includes detecting a standby mode of a set top box and selectively toggling an audio decoder of the set top box to an ON state in response to detecting the standby mode of the set top box.

In another non-limiting embodiment of the present disclosure, an apparatus includes a memory; and at least one processor. The at least one processor is configured to detect a standby mode of a set top box; and selectively toggle an audio decoder of the set top box to an ON state in response to detecting the standby mode of the set top box.

In another non-limiting embodiment of the present disclosure, a non-transitory computer readable media stores one or more instructions executable by at least one processor. The one or more instructions include one or more instructions for detecting a standby mode of a set top box; and one or more instructions for selectively toggling an audio decoder of the set top box to an ON state in response to detecting the standby mode of the set top box.

In another non-limiting embodiment of the present disclosure, a system includes a set-top box and at least one input device. The set top box includes an audio decoder and at least one processor operatively coupled with the audio decoder and configured to detect a standby mode of the set top box; and selectively toggle the audio decoder to an ON state in response to detecting the standby mode. The at least one input device is operatively coupled with the at least one processor for transmitting at least one input for playback of at least one audio content in the standby mode. The at least one processor is further configured to receive the at least one input for playback of the at least one audio content in the standby mode and retrieve the at least one audio content from at least one content source. The at least one processor is further configured to enable playback of the retrieved at least one audio content after decoding by the audio decoder.

In yet another non-limiting embodiment of the present disclosure, a method includes detecting a standby mode of a set top box and selectively maintaining an ON state of an audio decoder of the set top box in response to detecting the standby mode of the set top box.

In a further non-limiting embodiment of the present disclosure, an apparatus includes a memory; and at least one processor. The at least one processor is configured to detect a standby mode of a set top box; and selectively maintain an ON state of an audio decoder of the set top box in response to detecting the standby mode of the set top box.

In a furthermore non-limiting embodiment of the present disclosure, a non-transitory computer readable media stores one or more instructions executable by at least one processor. The one or more instructions include one or more instructions for detecting a standby mode of a set top box; and one or more instructions for selectively maintaining an ON state of an audio decoder of the set top box in response to detecting the standby mode of the set top box.

Particular advantages provided by at least one of the disclosed embodiments include effective utilization of the standby mode of the set top box (STB) by leveraging the capabilities supported on the STB. The disclosed embodiments transform the STB into an assistance device without the need of any additional hardware from third party or external vendor. In one particular embodiment, the disclosed embodiments transform the STB operating in standby mode into a smart music player while significantly extending user experience when a user is not interested in watching television.

The foregoing summary is illustrative only and is not intended to be in any way limiting. In addition to the illustrative embodiments, and features described above, further embodiments, and features will become apparent by reference to the drawings and the following detailed description.

BRIEF DESCRIPTION OF THE ACCOMPANYING DRAWINGS

The accompanying drawings, which are incorporated in and constitute a part of this disclosure, illustrate exemplary embodiments and, together with the description, serve to explain the disclosed principles. Some embodiments of system and/or methods in accordance with embodiments of the present subject matter are now described, by way of example only, and with reference to the accompanying Figures, in which.

It should be appreciated by those skilled in the art that any block diagrams herein represent conceptual views of the illustrative systems embodying the principles of the present subject matter. Similarly, it will be appreciated that any flowcharts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however, that it is not intended to limit the disclosure to the particular form disclosed, but on the contrary, the disclosure is to cover all modifications, equivalents, and alternatives falling within the spirit and the scope of the disclosure.

The terms "comprise(s)", "comprising", "include(s)", or any other variations thereof, are intended to cover a non-exclusive inclusion, such that a setup, device, apparatus, system, or method that comprises a list of components or steps does not include only those components or steps but may include other components or steps not expressly listed or inherent to such setup or device or apparatus or system or method. In other words, one or more elements in a device or system or apparatus proceeded by "comprises . . . a" does not, without more constraints, preclude the existence of other elements or additional elements in the system.

The terms like "at least one" and "one or more" may be used interchangeably or in combination throughout the description.

In the following detailed description of the embodiments of the disclosure, reference is made to the accompanying drawings that form a part hereof, and in which are shown by way of illustration of specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense. In the following description, well known functions or constructions are not described in detail since they would obscure the description with unnecessary detail.

The present disclosure describes methods, systems, apparatuses, and computer readable media for operating a set top box (STB) in standby mode. The STB is a hardware device that receives, decodes, and displays the digital signals on a connected audiovisual device (e.g., a television set (TV)). The STB is mainly used for the purpose of streaming audiovisual content on the TV. The audio-visual content is retrieved from the one or more content sources and is decoded by audio/video decoders of the STB before being transmitted to the TV for streaming/playback.

The STB mainly operates in three operating modes: an on-mode, a standby mode, and an off-mode. A STB in on-mode operates all its operational modules, while in off-mode deactivates all operational modules and takes several minutes for changing its mode to on-mode. The STB in standby mode deactivates almost all its operational modules and processes. Still the STB in the standby mode consumes about ten-times more power compared to the power consumption of a TV during a standby state. Nowadays, to reduce the power consumption, active standby and passive standby modes have been proposed as operational modes for the STB. Specifically, passive standby mode or low power mode has been introduced to reduce the standby power consumed by the STB.

In the active standby mode, a STB activates most of the operational modules except the audio/video decoders, processor, and output interfaces. Therefore, the STB in the active standby mode may have a short activation latency. On the other hand, a STB in the passive standby mode operates only the remote-control unit interface, front panel, and real-time clock timer. The components of the STB which could be in low power mode may include tuners, memory, and LED's. Compared to the active standby mode, the passive standby mode saves more power by turning off more STB functions but results in longer activation latency.

Conventionally, when the STB enters the standby mode, both the audio decoder and the video decoder are deactivated or turned off, and the STB does not output any audio or video content. Thus, in the standby mode the STB cannot playback any audio or video content. However, as described in background, there exist a need to effectively utilize the standby mode of the STB and transform the STB into an assistant device in the standby mode. In an exemplary embodiment, there exists a need to transform the STB into a smart audio streaming device in the standby mode.

In an embodiment, the present disclosure achieves this objective by selectively toggling the audio decoder of the STB to an ON state in response to detecting that the STB is in the standby mode. In another embodiment, the present disclosure achieves this objective by selectively maintaining an ON state of the audio decoder of the STB in response to detecting that the STB is in the standby mode. In a non-limiting embodiment of the present disclosure, the STB may be used as a smart audio streaming device in the standby mode. The various embodiments of the present disclosure are described below in more details.

Figure 1:
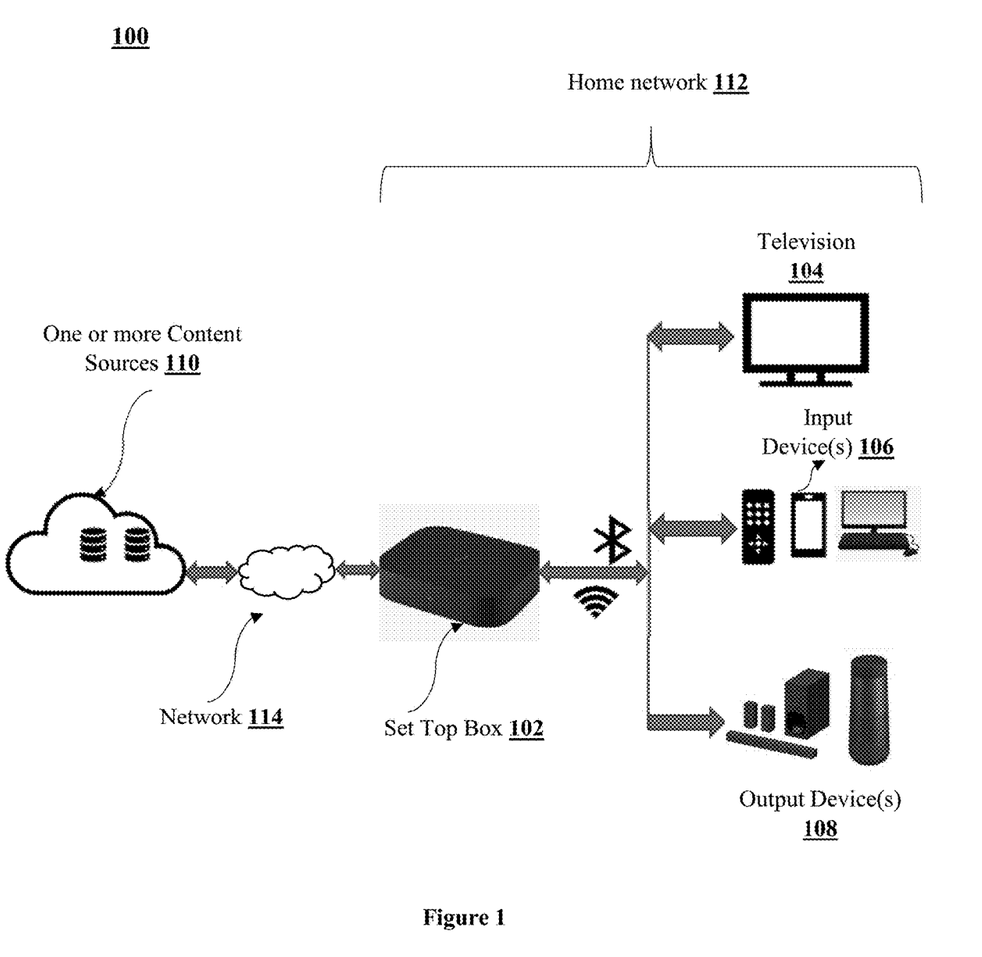
FIG. 1 shows an exemplary environment illustrating a communication system 100 comprising a set top box, in accordance with some embodiments of the present disclosure.

Referring now to FIG. 1, an exemplary communication system is shown for operating a set top box (STB) in a standby mode and is generally designated as the communication system 100. The communication system 100 comprises a STB 102 which is in communication with at least one content source 110 via a network 114. The at least one content source 110 may comprise various contents such as, but not limited to, any combination of video and audio contents, internet web pages, or interactive games. In a non-limiting embodiment, the one or more content sources 110 may comprise content servers of over the top (OTT) applications such as YouTube, YT Music, Apple Music, Netflix, Amazon Music, Spotify, Prime Videos, and like. In another non-limiting embodiment, the one or more content sources 110 may comprise any content server such as content servers of, but not limited to, Amazon, Facebook, Instagram, Wikipedia, Google books, Chrome, Twitter etc. The content servers of the one or more content sources 110 may be accessed using dedicated application or using web browsers. The STB 102 may receive content from the one or more content sources 110 via the network 114.

The network 114 may comprise a data network such as, but not restricted to, the Internet, Local Area Network (LAN), Wide Area Network (WAN), Metropolitan Area Network (MAN), etc. In certain embodiments, the network 114 may include a wireless network, such as, but not restricted to, a cellular network and may employ various technologies including Enhanced Data rates for Global Evolution (EDGE), General Packet Radio Service (GPRS), Global System for Mobile Communications (GSM), Internet protocol Multimedia Subsystem (IMS), Universal Mobile Telecommunications System (UMTS) etc. In one embodiment, the network 114 may include or otherwise cover networks or subnetworks, each of which may include, for example, a wired or wireless data pathway.

In an embodiment, the STB 102 may be communicatively coupled with one or more external devices. For example, the STB 102 may be communicatively coupled with at least one display device or audiovisual device, one or more input devices 106, and one or more output devices 108. The at least one display device may comprise any display device such as a television set (TV) 104, a monitor, and like. The one or more input devices 106 may comprise any input device such as, but not limited to, a microphone; a remote-control device (e.g., a TV remote or a STB remote); a mobile device (e.g., a smartphone, a mobile phone, a personal digital assistant); a computing device (e.g., a desktop computer, a laptop computer, a tablet device), or any other type of computing device which has the capabilities of transmitting commands to the STB 102. The one or more output devices 108 may comprise any output device capable of outputting audio content such as speakers, TVs, soundbars, earpieces, home theater, and like. The devices 104, 106, 108 may be communicatively coupled with the STB 102 via wired connection or wireless connection (e.g., Bluetooth or Wi-Fi). In the present disclosure, the TV 104 may act as both an input device and an output device.

Figure 2:
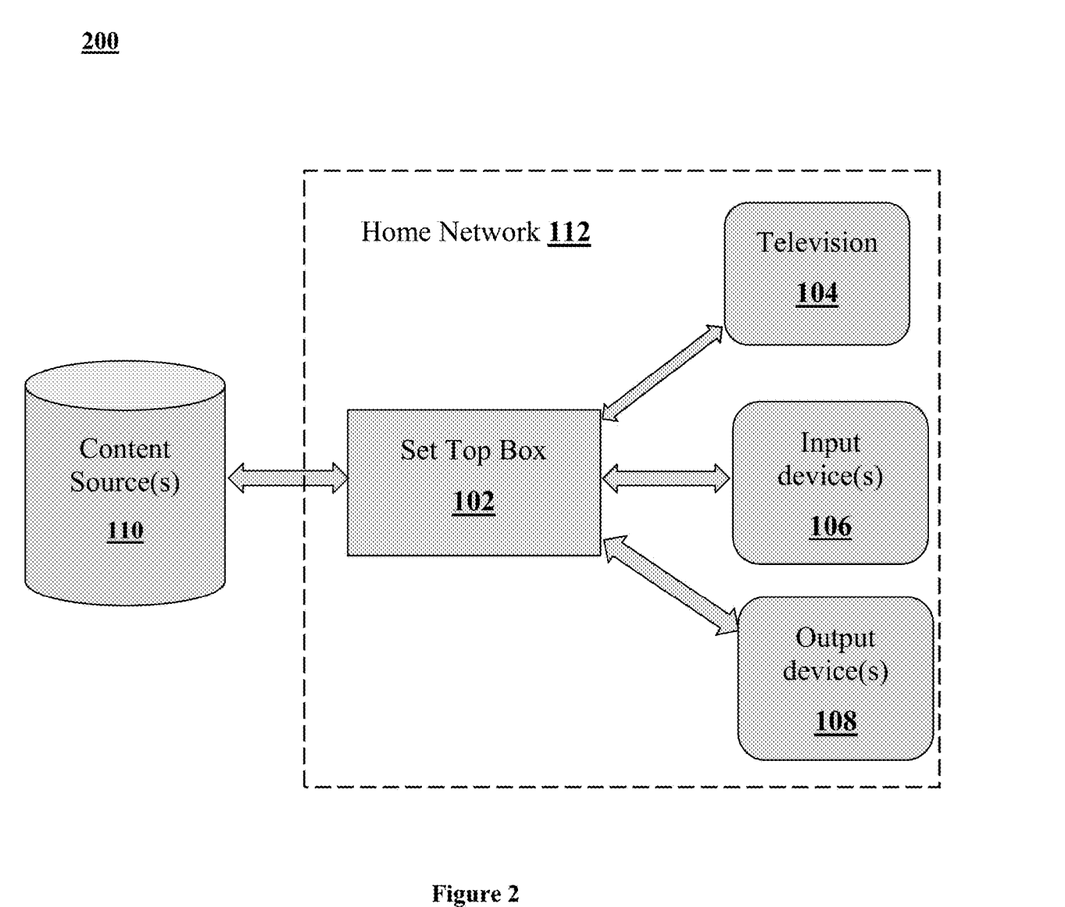
FIG. 2 shows a block diagram 200 of the communication system 100 illustrated in FIG. 1, in accordance with some embodiments of the present disclosure.

Referring now to FIG. 2, which illustrates a block diagram 200 of the communication system 100 shown in FIG. 1. As illustrated in FIG. 2, the STB 102 and the devices 104, 106, 108 may together form a home network 112. However, it may be understood to a person skilled in art that the present disclosure is not limited to the communication system 100 illustrated in FIGS. 1-2 and may be implemented in various other communication systems as well, other than the ones shown in FIGS. 1-2.

Figure 3:
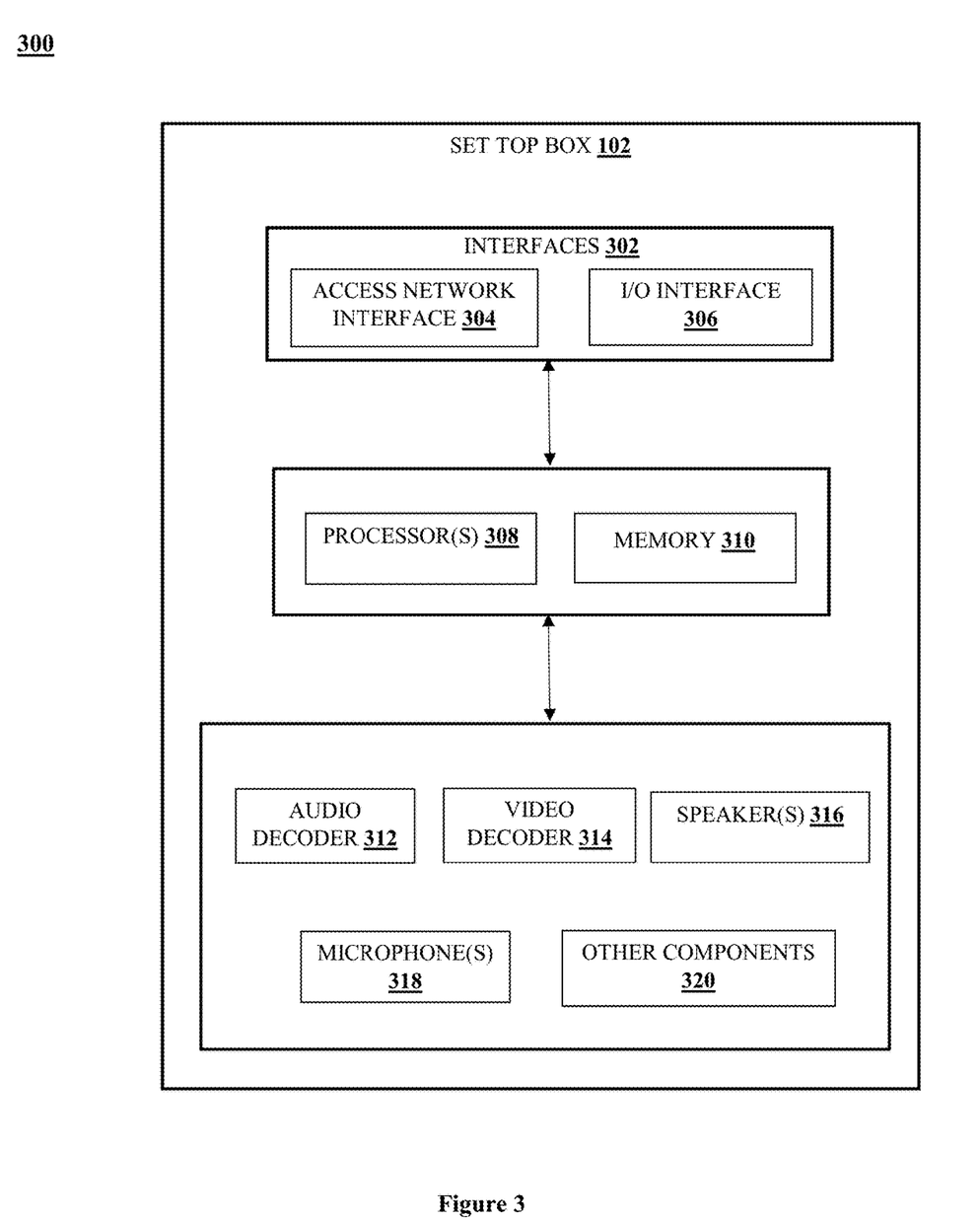
FIG. 3 shows a block diagram 300 of a set top box, in accordance with some embodiments of the present disclosure.

Now, FIGS. 1 and 2 are explained in conjunction with FIG. 3 which shows a block diagram 300 illustrating the set top box (STB) 102 in accordance with some embodiments of the present disclosure. According to an embodiment of the present disclosure, the STB 102 may comprise various components communicatively coupled with at least one processor 308. The various components may comprise interfaces 302, an audio decoder 312, a video decoder 314, a memory 310, one or more speakers 316, one or more microphones 318, and various other components 320.

The at least one processor 308 may include, but not restricted to, a general-purpose processor, a Field Programmable Gate Array (FPGA), an Application Specific Integrated Circuit (ASIC), a Digital Signal Processor (DSP), microprocessors, microcomputers, micro-controllers, digital signal processors, central processing units, state machines, logic circuitries, and/or any devices that manipulate signals based on operational instructions. The interfaces 302 may include a variety of software and hardware interfaces, for example, a web interface, a graphical user interface, an input device-output device (I/O) interface 306, an access network interface 304 and the like. The I/O interface 306 may allow the set top box 102 to interact with the devices 104, 106, 108 directly or through other devices. The access network interface 304 may allow the set top box 102 to interact with the one or more content sources 110 via the network 114.

The memory 310 may be communicatively coupled to the at least one processor 308. The memory 310 may comprise various data and one or more instructions. The memory 310 may comprise various software modules/codes such as, but not limited to, Bluetooth and Wi-Fi drivers, module for detecting the standby mode of the STB 102, module for selectively toggling the audio decoder 312 to ON state upon detecting the standby mode of the STB 102, module for selectively maintaining an ON state of the audio decoder 312 upon detecting the standby mode of the STB 102, speech-to-text conversion modules, text-to-speech conversion modules, searching module, alarm APIs etc. The memory 310 may include a Random-Access Memory (RAM) unit and/or a non-volatile memory unit such as a Read Only Memory (ROM), optical disc drive, magnetic disc drive, flash memory, Electrically Erasable Read Only Memory (EEPROM), a memory space on a server or cloud and so forth.

In a non-limiting embodiment of the present disclosure, two types of memory may be primarily used for STBs i.e., RAM and Flash memory (not shown in Figures). The RAM is a memory that is available to the at least one processor 308 when the STB 102 is booted up and running RAM is essential to run and execute applications, but RAM loses its contents when the STB 102 is turned off or if the content is not refreshed by an external charge. Thus, RAM is considered volatile memory. On the other hand, the flash memory is non-volatile in nature and may store core applications of a cable video service, which include firmware, middleware etc.

In a non-limiting embodiment of the present disclosure, the audio decoder 312 may be used for the purpose of decoding the audio content retrieved from the one or more content sources 110 and the video decoder 314 may be used for the purpose of decoding video content received from the one or more content sources 110. Further, the STB 102 may comprise one or more speakers 316 communicatively coupled with the at least one processor 308 to produce audio output and one or more microphones 318 communicatively coupled with the at least one processor 308 to input audio commands. The STB 102 may further comprise additional components 322 such as, but not limited to, Wi-Fi and Bluetooth chipsets, sensors, tuners, user interface, filters, amplifiers, one or more buttons, display, front panel LEDs etc communicatively coupled with the at least one processor 308.

In a non-limiting embodiment of the present disclosure, all components of the STB 102 may be integrated onto a single chip named as a system on a chip (SoC). The SoC is an integrated circuit that takes a single platform and integrates an entire electronic or computer system onto it. This embodiment is particularly helpful for reducing the energy waste, saving the spending costs, and reducing the space occupied by individual components.

In a non-limiting embodiment of the present disclosure, the STB 102 may enter the standby mode to save power in various components of the STB 102. The STB 102 may enter the standby mode based on various predetermined criteria. The at least one processor 308 may continuously monitor the operational mode of the STB 102 and may detect that the STB 102 is in standby mode based on various criteria/conditions, as described below.

In one non-limiting embodiment of the present disclosure, the at least one processor 308 may receive an input from an external device. In one embodiment, the input may be indicative of a soft press of a power button on the external device. It may be noted here that the soft press of the power button may comprise pressing a physical button provided on the external device or softly touching a power button displayed on a user interface/touch screen of the external device. In response to receiving the input, the STB 102, which is currently operating in an on mode, may change its operational mode to a standby mode. Thus, the at least one processor 308 may detect that the STB 102 is in the standby mode in response to receiving the input from the external device indicative of a soft press of the power button on the external device.

In another non-limiting embodiment of the present disclosure, the at least one processor 308 may be configured to receive at least one input from the TV 104. The at least one input may be indicative of a standby state or a power OFF state of the TV 104. The TV 104 may send the at least one input to the STB 102 immediately after receiving the standby/power off command. In response to receiving the at least one input from the TV 104, the STB 102 may enter the standby state. Thus, the at least one processor 308 may detect that the STB 102 is in the standby mode in response to receiving the at least one input indicative of a standby state or a power OFF state of the TV 104.

In one embodiment, the TV 104 may enter into the standby state based on one or more predefined conditions such as, but not limited to, a preset timer expires, when no input is received from an external device for a predetermined time period, when no button (provided on the TV 104) is pressed for the predetermined time period, when no signal is received at the TV 104 for a predetermined time period (in such case "No Signal", "No Source", "No Input" or similar message may appear on the TV screen), when the signal is received but no content is being played on TV screen for a predetermined time period (e.g., TV screen is displaying only channel list).

In yet another non-limiting embodiment of the present disclosure, the STB 102 may enter the standby mode when no input is received from an external device for a predetermined interval of time. The at least one processor 308 may be configured to detect the standby mode of the STB 102 in response to receiving no input from the external device for the predetermined interval of time. For e.g., the STB 102 may enter the standby mode when no input is received from a STB remote for the predetermined interval of time. It may be noted here that the STB 102 may not consider the state of the TV 104 (i.e., whether a user is watching the content being played on the TV 104 or not) while entering the standby mode. Thus, the STB 102 may enter the standby mode even when a user is watching the content being played back on the TV 104.

In yet another non-limiting embodiment of the present disclosure, the state of the TV 104 (i.e., whether a user is watching the content being played on the TV 104 or not) may be considered before the at least one processor 308 decides to enter the STB 102 into the standby mode. The at least one processor 308 may initially wait for an input from the external device for the predetermined interval of time. In response to receiving no input from the external device for the predetermined interval of time, the at least one processor 308 may decide to enter the STB 102 into the standby mode subject to one or more predetermined conditions. The one or more predetermined conditions may determine whether a user is watching the content being played on the TV 104 or not.

In one embodiment, after expiration of the predetermined interval of time, the at least one processor 308 may prompt the user to provide any input indicating that the user is watching the content being played on the TV 104. The prompt may be at least one of: a message displayed on the TV screen and/or on the display of the STB 102; and an audio message being played back on the speakers of the TV and/or STB. The prompt may indicate that the STB 102 is about to enter the standby state after a specified interval of time. The prompt may last for a predetermined duration of time and may be repeated for a predetermined number of times. The at least one processor 308 may decide to enter the STB 102 into the standby mode in response to receiving no response of the prompt.

According to the above-discussed embodiments of detecting the standby mode, it may be worth noting that the STB 102 may immediately change its operational mode from the on mode to an active standby mode in response to any of: receiving no input from the external device and determining that the user is not watching the content being played on the TV 104; receiving the at least one input from the TV 104 indicating that the TV 104 is in standby state or power OFF state; receiving an input from the external device indicative of a soft press of the power button on the external device;

and receiving no input from the external device. Further, the STB 102 may change its operational mode from the active standby mode to a passive standby mode in response to a predetermined time period lapse after entering into the active standby mode.

In an embodiment, the value of the predetermined time period may be a fixed value. In another embodiment, the value of the predetermined time period may dynamically change based on various factors such as the historical playback data of the TV 104. For example, if the input is received at a seldom-used time (i.e., time when there is less probability of the TV 104 being watched), the value of the predetermined time period may be large because there is less probability of the TV 104 being watched. However, if the input is received at a frequently used time (i.e., time when there is high probability of the TV 104 being watched), the value of the predetermined time period may be small. The determination of whether a particular time is a seldom-used time or a frequently used time may be based on the historical playback data of the TV 104. This determination may be performed using any machine learning or artificial intelligence techniques known in the art.

In the illustrated embodiments, the at least one processor 308 or the STB 102 may be operatively coupled with an external device and the external device may be selected from a group comprising: a remote-control device (e.g., a TV remote, a STB remote etc.), a mobile device (e.g., a smartphone, a mobile phone etc.), and a portable computing device. If the external device is a mobile device or a portable computing device, a software application may be installed on the mobile device or the portable communication device, the software application may provide an interface for controlling the operations of the STB 102 and/or the TV 104.

In one non-limiting embodiment of the present disclosure, upon detecting, using the above-described techniques, that the STB 102 is in the standby mode, the at least one processor 308 may selectively toggle the audio decoder 312 of the STB 102 to an ON state i.e., the at least one processor 308 may selectively activate the audio decoder 312 of the STB 102 while keeping the video decoder 314 in the OFF state. This specific operational mode of the STB 102 may be termed as audio only ON mode or video only OFF mode. In one embodiment, the at least one processor 308 may automatically toggle the audio decoder 312 to an ON state upon detecting that the STB 102 is in the standby mode. In another embodiment, the at least one processor 308 may wait for an input from the external device while the STB 102 is in the standby mode and toggle the audio decoder 312 to an ON state in response to receiving the input while keeping the STB 102 in the standby mode.

In another non-limiting embodiment of the present disclosure, upon detecting that the STB 102 is in the standby mode, the at least one processor 308 may selectively maintain an ON state of the audio decoder 312 of the STB 102 in the standby state i.e., the at least one processor 308 may selectively deactivate the video decoder 314 while keeping the audio decoder 312 activated/ON. This specific operational mode of the STB 102 may also be termed as audio only ON mode or video only OFF mode.

When the audio decoder 312 of the STB 102 is active in the standby mode, the STB 102 may be used as an assistant device i.e., the STB 102 may receive at least one input and return relevant information or perform specific functions based on the received at least one input. The at least one input may comprise at least one voice command or at least one text command. The at least one input may be received from at least one device operatively coupled with the STB 102 and the at least one device may be selected from a group comprising: a microphone, a remote-control device, a portable computing device, and a mobile device. In one aspect, the microphone may be provided inside the STB 102 and may be operatively coupled with the at least one processor 308.

The STB 102 as the assistance device may be utilized for several purposes. In one non-limiting embodiment of the present disclosure, the STB 102 may be utilized as an audio streaming device in the standby mode. The at least one processor 308 of the STB 102 may receive at least one input for playback of at least one audio content. The at least one input may be received from the at least one input device. The at least one processor 308 may retrieve the at least one audio content from at least one content source 110 and the audio decoder 312 of the STB 102 may decode the retrieved at least one audio content. The at least one processor 308 may then enable playback of the decoded at least one audio content.

In one non-limiting embodiment of the present disclosure, the at least one input may comprise at least one voice command and the at least one processor 308 may process the received at least one input. The at least one processor 308 may convert the at least voice command into at least one text string using the speech-to-text conversion module. The at least one processor 308 may then search for the at least one audio content in the at least one content source 110 based on the at least one text string using the searching module.

In another non-limiting embodiment of the present disclosure, the at least one input may comprise at least one text command and the at least one processor 308 may directly search for the at least one audio content in the at least one content source 110 based on the at least one text command. In this embodiment, the STB may have the capability of receiving the text input command from the at least one input device.

The at least one content source 110 may comprise any content source for which a user has paid subscription or any freebie content source. Examples of the content sources 110 may include content servers of OTT applications such as YouTube, YT Music, Apple Music, Netflix, Amazon Music, Spotify, Prime Videos, and like. The at least one processor 308 may search the at least one audio content in these content sources based on the received command. In one embodiment, the at least one input may comprise an input indicating the choice of a desired content source. The at least one processor 308 may retrieve the at least one audio content from the desired content source. However, if the at least one audio content is not available on the desired content source or if the input does not indicate any desired content source, the at least processor 308 may select most relevant content source from the available content sources 110 based on one or more factors such as, but not limited to, access time of the content source, historical searching/downloading/playback patterns of the user, content quality/rating, user engagement, total number of downloads/playbacks of the content, age of content source etc. If more than one instances of the same audio content are available on a selected/desired content source, the at least one processor 308 may select a most relevant instance for playback based on one or more factors such as, but not limited to, views count, rating, total likes/dislikes count, like/dislikes of user, content quality, historical patterns of user, uploading time, content duration etc.

In one non-limiting embodiment of the present disclosure, the decoded audio content may be played back directly on the STB 102 such as on the speakers 316. In another non-limiting embodiment of the present disclosure, the decoded audio content may be played back on at least one device communicatively coupled with the STB 102 and selected from a group comprising: the TV 104 and output devices 108 (i.e., a speaker, an earpiece, a home theater, a soundbar etc.). The at least one device may be communicatively coupled with the STB 102 via wired connection or wireless connection (e.g., Bluetooth or Wi-Fi). In one embodiment, the STB 102 may support simultaneous playback on multiple devices.

In one non-limiting embodiment of the present disclosure, a prompt may be presented on the TV screen (if the TV is in ON state) indicating active devices for playback of the at least one audio content and the user may select a desired device for playback using the at least one input device. In another non-limiting embodiment of the present disclosure, the at least one input may comprise an indication of a desired device for playback of the at least one audio content and the at least one processor 308 may enable playback of the at least one audio content on the desired device. In another non-limiting embodiment, at least one device for playback may be selected based on predefined device priorities. In another non-limiting embodiment, the first priority may be assigned to TV speakers. However, if the desired device is not active or the at least one input does not indicate any desired device or there is no priority assigned, the at least processor 308 may select an appropriate device from active devices based on one or more factors such as, but not limited to, distance/range of the active devices from the STB 102, signal strength etc. In yet another non-limiting embodiment, the user may select the desired device for playback of the audio content from the at least one input device.

In one non-limiting embodiment of the present disclosure, the at least input may comprise a specified time duration for playback of the at least one audio content and the at least processor 308 may enable playback of the at least one audio content for the specified time duration.

In one embodiment, some functions of the at least one processor 308 of the STB 102 may be performed by the at least one content source 110 having at least one processor (referred as 'at least one second processor' for the sake of explanation). In the above-described embodiments, the at least one processor 308 after receiving the at least one input for the at least one audio content may forward the at least one input to the at least one second processor. The at least one second processor may process the received at least one input and may convert the received at least one input into at least one text string (if the received at least one input is a voice command). The at least one second processor may then search for the at least one audio content in the one or more content sources 110 based on the at least one text string and may retrieve the at least one audio content using the techniques described in paragraphs [00063-0065] of the present disclosure. Further, the at least one second processor may send the retrieved at least one audio content to the at least one processor 308 of the STB 102. The audio decoder 312 of the STB 102 may then decode the received audio content and the at least one processor 308 may enable the playback of the decoded audio content. In an alternative embodiment, the input to the at least one second processor may be a text command.

Thus, by enabling the STB 102 as a smart audio player in the standby mode, the present disclosure provides the assistant audio device solution in the STB 102 without having any additional hardware from third party or external vendor. Further, the audio streaming in standby mode allows the STB 102 to act as smart music players thereby, significantly improving the user experience when the user is not interested to watch the TV 104 or wants to listen only the audio content of an ongoing video playback.

In another non-limiting embodiment of the present disclosure, the STB 102 may be used to readout notifications/alerts in the standby mode. The notifications may be received from at least one content source (such as streaming media platforms, social media platforms, mobile and web applications, and like). The at least one notification may be a text notification and the at least one processor 308 may process the received notification using the text-to-speech module to synthesize/create at least one audio content corresponding to the received notification. The audio decoder 312 of the STB 102 may decode the synthesized at least one audio content and the at least one processor 308 may enable playback of the decoded at least one audio content corresponding to the at least one notification.

In yet another non-limiting embodiment of the present disclosure, the STB 102 may be used to set a reminder or alarm and enable playback of the same in the standby mode. The at least one processor 308 may receive at least one input for setting up at least one reminder for at least one scheduled time. The at least one processor 308 may process the received at least one input for extracting relevant information from the received at least one input, the relevant information may comprise one or more of: at least one scheduled time for the reminder, a playback duration, whether the reminder is a recurring reminder, interval between two successive reminders (in case the reminder is recurring reminder) etc. The at least one processor 308 may set the reminder using the alarm API and may enable playback of the at least one reminder based on the extracted information.

A conflict might occur due to simultaneous playback of one or more of: at least one audio/music content, an alarm/reminder playback, and a notification read out. To overcome this challenge, in one non-limiting embodiment of the present disclosure, the at least one processor 308 may assign a priority to different types of contents. For example, in one aspect a high priority may be assigned to notifications, alarms, reminders over music content. The at least one processor 308 may pause the playback of the low priority audio content (e.g., music content) until the high priority audio content playback (e.g., notification readout, alarm/reminder playback) is completed. In another non-limiting embodiment of the present disclosure, the at least one processor 308 may overlay or mute the low priority audio content when a playback of the high priority audio content is detected.

In other non-limiting embodiment of the present disclosure, a skilled person after understanding the present disclosure can easily utilize the STB 102 in the standby mode for several other purposes as well. Few of them are listed below:

Read out of e-Books on the connected output devices in the standby mode of the STB 102.

Story narration on the connected output devices in the standby mode of the STB 102.

Listen to live audio news on the connected output devices in the standby mode of the STB 102.

Listen to radio channels on the connected output devices in the standby mode of the STB 102.

Playback of music/audio for a scheduled duration on the connected output devices in the standby mode of the STB 102.

Wake up alert or reminder for any scheduled time (e.g., for any scheduled TV program) on the connected output devices in the standby mode of the STB 102.

In general, the STB 102 may be used as an assistant device by leveraging on OTT, Bluetooth, Wi-Fi features supported on the STB 102. Therefore, the present disclosure effectively utilizes the standby state of the STB 102 by leveraging the capabilities supported on the STB 102 and perform audio streaming on connected output devices in the standby mode.

Figure 4:
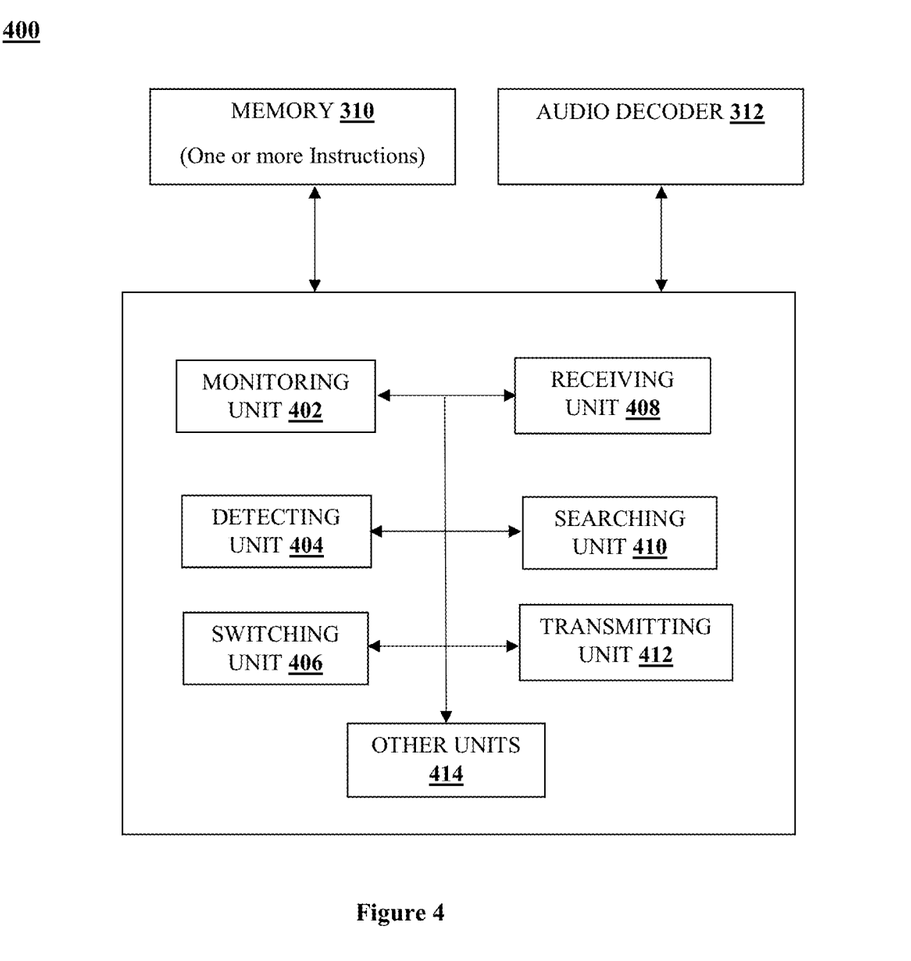
FIG. 4 shows another block diagram 400 of the set top box, in accordance with some embodiments of the present disclosure.

In another non-limiting embodiment of the present disclosure, the STB 102 may comprise various units or means as shown in FIG. 4. The units may comprise a monitoring unit 402, a detecting unit 404, a switching unit 406, a receiving unit 408, a searching unit 410, a transmitting unit 412, and other units 414. The other units 414 may comprise a determining unit, a synthesizing unit, a timer etc. In an embodiment, the units 402-414 may be dedicated hardware units capable of executing one or more instructions stored in the memory 310 for performing various operations of the STB 102. In another embodiment, the units 402-414 may be software modules stored in the memory 310 which may be executed by the at least one processor 308 for performing the operations of the STB 102.

Figure 5:
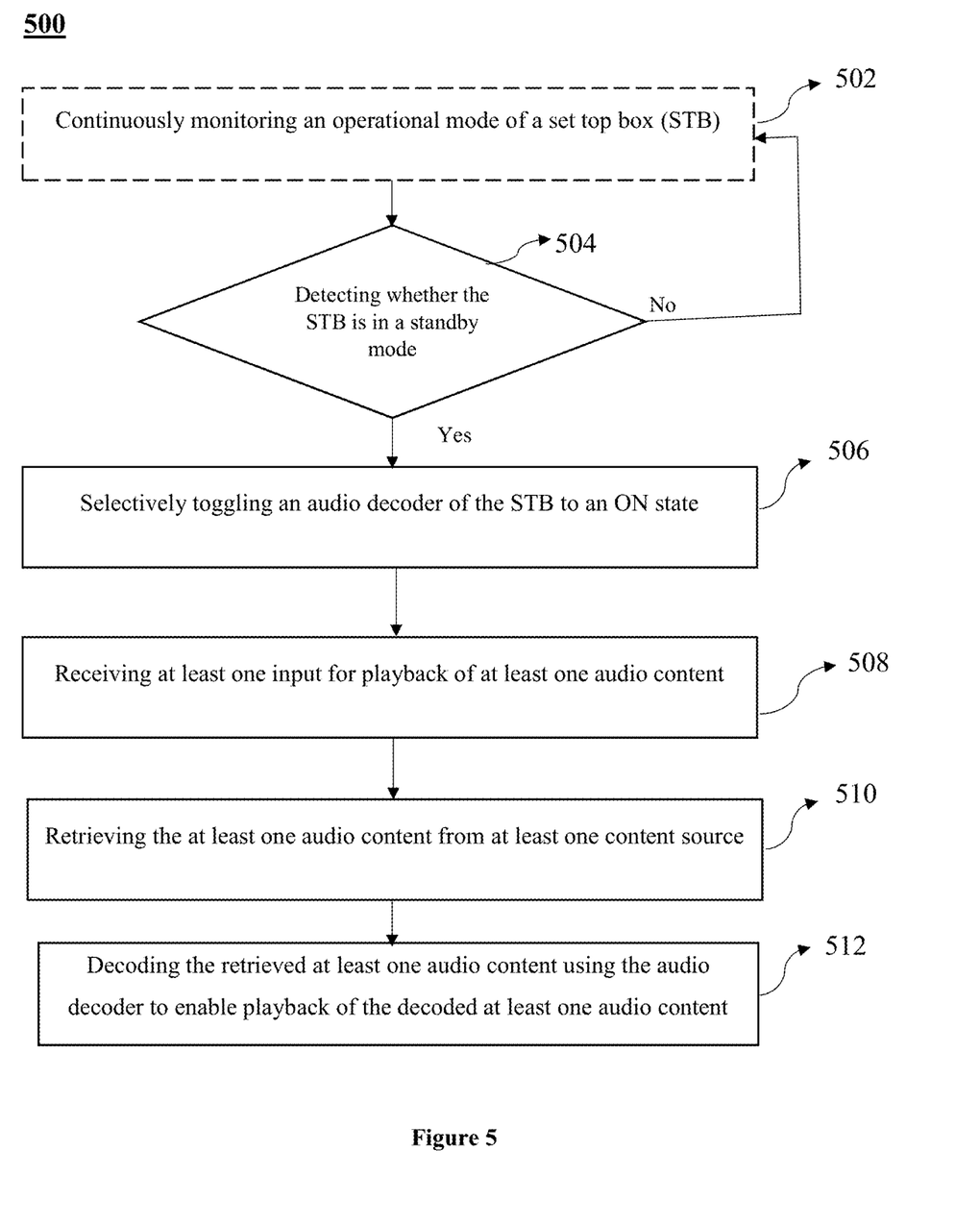
FIG. 5 depicts a flowchart 500 illustrating an example method of operating a set top box, in accordance with some embodiments of the present disclosure.

Referring now to FIG. 5, a flowchart illustrating a method for operating a set top box (STB) 102 in a standby mode is depicted, in accordance with some embodiments of the present disclosure.

As illustrated in FIG. 5, the method 500 includes one or more blocks illustrating a method for operating the STB 102 in the standby mode. The method 500 may include, at an optional block 502, continuously monitoring the operational mode of the STB 102. The operations of block 502 may be performed by the at least one processor 308 of FIG. 3 or by a monitoring unit 402 of FIG. 4. For example, the at least one processor 308 may continuously monitor the operational mode of the STB 102 i.e., whether the STB 102 is in on-mode or in standby mode.

The method 500 may also include, at block 504, detecting whether the STB 102 is in a standby mode. The operations of block 504 may be performed by the at least one processor 308 of FIG. 3 or by a detecting unit 404 of FIG. 4. For example, the at least one processor 308 may detect whether the STB 102 is in a standby mode based on the monitoring.

The method 500 may further include, at block 506, selectively toggling an audio decoder 312 of the STB 102 to an ON state in response to detecting the standby mode of the STB 102. The operations of block 506 may be performed by the at least one processor 308 of FIG. 3 or by a switching unit 406 of FIG. 4. For example, the at least one processor 308 may selectively toggle the audio decoder 312 of the STB 102 to an ON state in response to detecting the standby mode of the STB 102.

The operation of block 504 i.e., detecting the STB 102 is in standby mode may be based on various criteria/conditions. In a specific embodiment, detecting the standby mode of the STB 102 may comprise detecting the standby mode of the STB in response to receiving no input from an external device for a predetermined interval of time. For example, the at least one processor 308 may be configured to detect the standby mode of the STB 102 in response to receiving no input from the external device for the predetermined interval of time.

In another specific embodiment, detecting 504 the standby mode of the STB 102 may comprise waiting for an input from an external device for a predetermined interval of time and in response to receiving no input from the external device for the predetermined interval of time, detecting the standby mode of the STB 102 based on one or more predetermined conditions. The one or more predetermined conditions may determine whether a user is watching content being played on a TV 104 or not.

In one exemplary embodiment, the method 500 may comprise, after expiry of the predetermined interval of time, prompting a user to provide any input indicating that the user is watching the content being played on the TV 104. The prompt may be at least one of: a message displayed on the TV screen and/or on the display of the STB 102; and an audio message being played back on the speakers of TV and/or STB. The prompt may indicate that the STB 102 is about to enter the standby state after a specified interval of time. The prompt may last for a predetermined duration of time and may be repeated for a predetermined number of times. The method may further comprise entering into the standby mode in response to receiving no response of the prompt.

In yet another specific embodiment, detecting 504 the standby mode of the STB 102 may comprise detecting 504 the standby mode of the STB 102 in response to receiving an input from an external device, the input being indicative of a soft press of a power button on the external device.

In yet another specific embodiment, detecting 504 the standby mode of the STB 102 may comprise detecting the standby mode of the STB 102 in response to receiving at least one input indicative of a standby state or a power OFF state of the TV 104.

In an aspect, the STB 102 may be operatively coupled with external device and the external device may be selected from a group comprising: a remote-control device, a portable computing device, and a mobile device. Once the audio decoder 312 of the STB 102 is turned ON in the standby mode, the STB 102 may be used as a smart assistant device i.e., the STB 102 may receive at least one input and return relevant information or perform specific functions based on the received at least one input.

In one non-limiting embodiment of the present disclosure, the STB 102 may be utilized as an audio streaming device in the standby mode, as detailed below.

The method 500 may additionally include, at block 508, receiving at least one input for playback of at least one audio content. The at least one input may be received from at least one device operatively coupled with the STB 102, and the at least one device may be selected from a group comprising: a microphone, a remote-control device, a portable computing device, and a mobile device. The operations of block 508 may be performed by the at least one processor 308 of FIG. 3 or by a receiving unit 408 of FIG. 4.

The method 500 may include, at block 510, retrieving the at least one audio content from at least one content source 110 based on the received at least one input. The operations of block 510 may be performed by the at least one processor 308 of FIG. 3 or by a searching unit 410 of FIG. 4.

In an aspect, the at least one input may comprise at least one voice command, and the operation of block 510 i.e., retrieving the at least one audio content from the at least one content source 110 may comprise converting the at least one voice command into at least one text string and searching for the at least one audio content in the at least one content source 110 based on the at least one text string. In another aspect, the at least one input may comprise at least one text command, and the operation of block 510 i.e., retrieving the at least one audio content from the at least one content source 110 may comprise searching for the at least one audio content in the at least one content source based on the at least one text command.

The method 500 may include, at block 512, decoding the retrieved at least one audio content using the audio decoder 312 to enable playback of the decoded at least one audio content in the standby mode. The operations of block 512 may be performed by an audio decoder 312 of FIG. 3. For example, the audio decoder 312 may decode the retrieved at least one audio content to enable playback of the decoded at least one audio content.

In one non-limiting aspect of the present disclosure, some or all operations of the blocks 510 may be performed by at least one processor of at least one content source 110. In that scenario, the method may comprise forwarding the received at least one input (text command or voice command) to the at least one content source 110 and receiving the at least one audio content from the at least one content source 110. For example, the at least one processor 308 after receiving the at least one input for the at least one audio content may forward the at least one input to the at least one content source 110 which may process the received at least one input and may convert the received at least one input into at least one text string (if the received at least one input is a voice command). The at least one content source 110 may then search for the at least one audio content based on the at least one text string and may retrieve the at least one audio content. Further, the at least one content source 110 may send the retrieved at least one audio content to the at least one processor 308 of the STB 102.

In another non-limiting aspect of the present disclosure, the STB 102 may be utilized for enabling playback of notifications, as detailed below.

The method 500 may include, receiving at least one notification from at least one content source 110 and synthesizing at least one audio content corresponding to the at least one notification. Synthesizing may comprise converting a text notification into the at least one audio content. The operations of synthesizing may be performed by the at least one processor 308 of FIG. 3 or by a synthesizing unit of FIG. 4 (not shown). The notifications may be received from the at least one content source (such as streaming media platforms, social media platforms, mobile and web applications, and like). The at least one notification may be a text notification. The method may further include decoding the at least one audio content using the audio decoder 312 to enable playback of the at least one decoded audio content corresponding to the at least one notification. The operations of decoding may be performed by the audio decoder 312.

In an aspect, the audio content may be played back on the STB 102 i.e., on the speakers 316. In another aspect, the audio content may be played back on at least one device operatively coupled with the STB 102 and the at least one device may be selected from a group comprising: a television set, a speaker, an earpiece, a home theater, and a soundbar.

Figure 6:
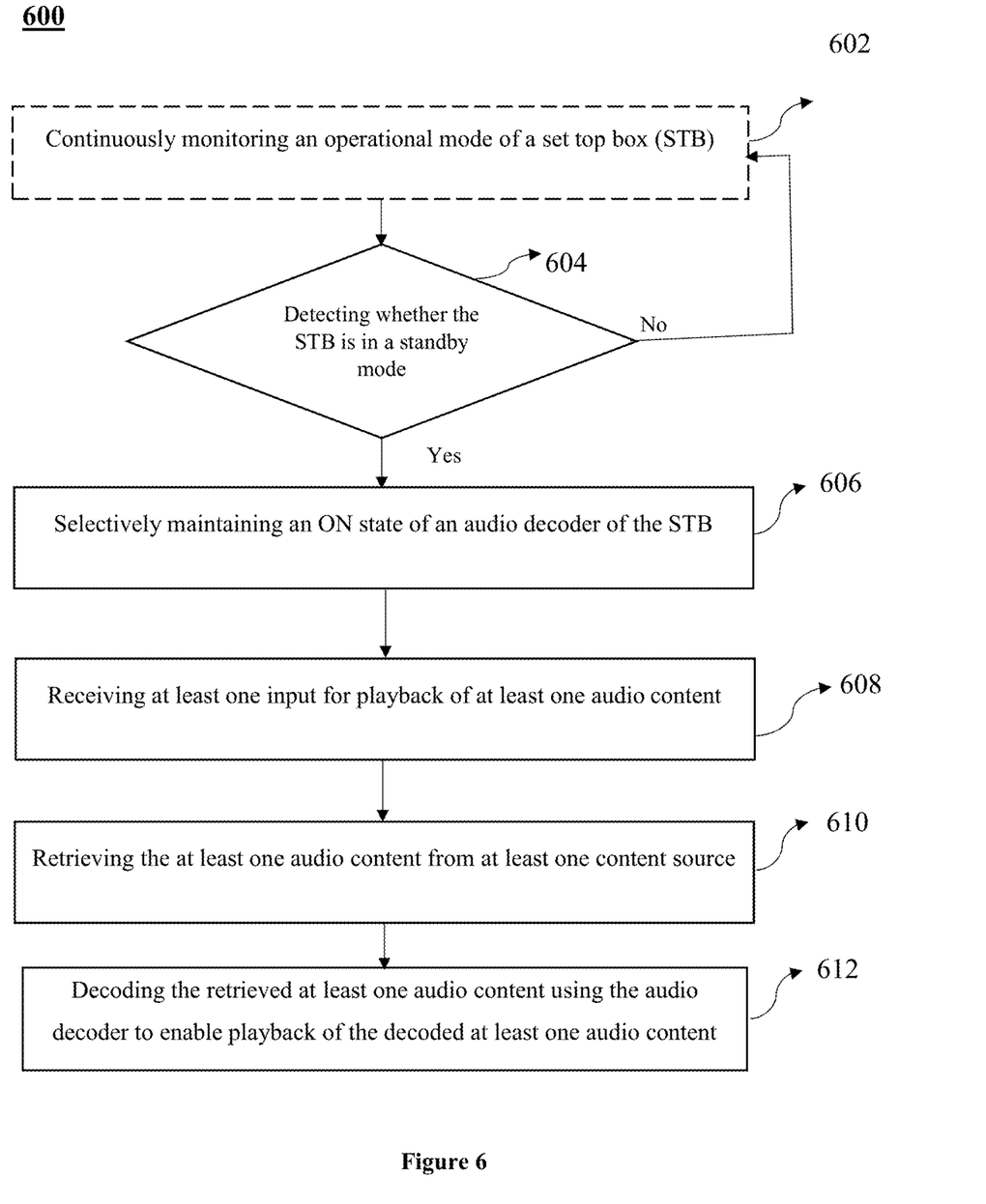
FIG. 6 depicts a flowchart 600 illustrating another example method of operating a set top box, in accordance with some embodiments of the present disclosure.

Referring now to FIG. 6, another flowchart illustrating a method for operating a set top box (STB) 102 in a standby mode is depicted, in accordance with some embodiments of the present disclosure.

As illustrated in FIG. 6, the method 600 may include one or more blocks illustrating a method for operating the STB 102 in the standby mode. It may be worth noting here that the method 600 differs from method 500 in operations of block 606, which is described below. Repetition of the remaining operations have been omitted for the sake of brevity.

The method 600 may include, at block 606, selectively maintaining an ON state of an audio decoder 312 of the STB 102 in response to detecting the standby mode of the STB 102. The operations of block 606 may be performed by the at least one processor 308 of FIG. 3 or by a switching unit 406 of FIG. 4. For example, the at least one processor 308 may selectively maintain an ON state of the audio decoder 312 of the STB 102 in response to detecting the standby mode of the STB 102.

The above methods may be described in the general context of computer executable instructions. Generally, computer executable instructions can include routines, programs, objects, components, data structures, procedures, modules, and functions, which perform specific functions or implement specific abstract data types. In one aspect, the methods may be performed by an apparatus comprising at least one processor 308 and a memory 310. In an aspect, the STB 102 may comprise the apparatus.

The order in which the various operations of the methods are described is not intended to be construed as a limitation, and any number of the described method blocks can be combined in any order to implement the method. Additionally, individual blocks may be deleted from the methods without departing from the spirit and scope of the subject matter described herein. Furthermore, the methods can be implemented in any suitable hardware, software, firmware, or combination thereof.

The various operations of methods described above may be performed by any suitable means capable of performing the corresponding functions. The means may include various hardware and/or software component(s) and/or module(s), including, but not limited to the at least one processor 308 of FIG. 3 and the various units of FIG. 4. Few operations of the methods may be implemented at an external server as well. Generally, where there are operations illustrated in Figures, those operations may have corresponding counterpart means-plus-function components.

In conjunction with the described embodiments, an apparatus is disclosed that includes a memory 310 and at least one processor 308. The at least one processor 310, either alone or in conjunction with other components of the STB 102, may be configured to implement the embodiments consistent with the present disclosure. In an aspect of the present disclosure, the apparatus may be a part of the STB 102 i.e., the STB 102 may comprise the apparatus.

In conjunction with the described embodiments, a system is disclosed that may comprise a set top box (STB) 102 and at least one input device to implement the embodiments consistent with the present disclosure. The STB 102 may comprise an audio decoder 312 and at least one processor 308 operatively coupled with the audio decoder 312. The at least one processor 308 may be configured to detect a standby mode of the set top box and selectively toggle the audio decoder 312 to an ON state in response to detecting the standby mode. The at least one input device may be operatively coupled with the at least one processor 308 for transmitting at least one input for playback of at least one audio content in the standby mode. The at least one processor 308 may be further configured to receive the at least one input for playback of the at least one audio content in the standby mode and retrieve the at least one audio content from at least one content source. The at least one processor 308 may be further configured to enable playback of the retrieved at least one audio content after decoding by the audio decoder 312.

It may be noted here that the subject matter of some or all embodiments described with reference to FIGS. 1-4 may be relevant for the methods and system and the same is not repeated for the same of brevity.

In a non-limiting embodiment of the present disclosure, one or more non-transitory computer-readable media may be utilized for implementing the embodiments consistent with the present disclosure. A computer-readable media refers to any type of physical memory (such as the memory 310) on which information or data readable by a processor may be stored. Thus, a computer-readable media may store one or more instructions for execution by the at least one processor 308, including instructions for causing the at least one processor 308 to perform steps or stages consistent with the embodiments described herein. The term "computer-readable media" should be understood to include tangible items and exclude carrier waves and transient signals. By way of example, and not limitation, such computer-readable media can comprise Random Access Memory (RAM), Read-Only Memory (ROM), volatile memory, nonvolatile memory, hard drives, Compact Disc (CD) ROMs, Digital Video Disc (DVDs), flash drives, disks, and any other known physical storage media.

Thus, certain aspects may comprise a computer program product for performing the operations presented herein. For example, such a computer program product may comprise a computer readable media having instructions stored (and/or encoded) thereon, the instructions being executable by one or more processors to perform the operations described herein. For certain aspects, the computer program product may include packaging material.

The various illustrative logical blocks, modules, and operations described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may include a microprocessor, but in the alternative, the processor may include any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

As used herein, a phrase referring to "at least one" or "one or more" of a list of items refers to any combination of those items, including single members. As an example, "at least one of: a, b, or c" is intended to cover: a, b, c, a-b, a-c, b-c, and a-b-c. The terms "a", "an" and "the" mean "one or more", unless expressly specified otherwise.

The terms "an embodiment", "embodiment", "embodiments", "the embodiment", "the embodiments", "one or more embodiments", "some embodiments", and "one embodiment", "other embodiment", "yet another embodiment", "non-limiting embodiment" mean "one or more (but not all) embodiments of the disclosure(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

A description of an embodiment with several components in communication with each other does not imply that all such components are required. On the contrary, a variety of optional components are described to illustrate the wide variety of possible embodiments of the disclosed methods and systems.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based here on. Accordingly, the embodiments of the present invention are intended to be illustrative, but not limiting, of the scope of the invention, which is set forth in the appended claims.

REFERRAL NUMERALS

| Reference Number | Description |
| --- | --- |
| 100 | COMMUNICATION SYSTEM |
| 102 | SET TOP BOX (STB) |
| 104 | TELEVISION SET |
| 106 | INPUT DEVICE(S) |
| 108 | OUTPUT DEVICE(S) |
| 110 | CONTENT SOURCE(S) |
| 112 | HOME NETWORK |
| 114 | NETWORK |
| 200 | BLOCK DIAGRAM OF COMMUNICATION SYSTEM |
| 300 | BLOCK DIAGRAM OF STB |
| 302 | INTERFACES |
| 304 | ACCESS NETWORK INTERFACE |
| 306 | I/O INTERFACE |
| 308 | PROCESSOR(S) |
| 310 | MEMORY |
| 312 | AUDIO DECODER |
| 314 | VIDEO DECODER |
| 316 | SPEAKER(S) |
| 318 | MICROPHONE(S) |
| 320 | OTHER COMPONENTS OF STB |
| 400 | BLOCK DIAGRAM OF STB |
| 402 | MONITORING UNIT |
| 404 | DETECTING UNIT |
| 406 | SWITCHING UNIT |
| 408 | RECEIVING UNIT |
| 410 | SEARCHING UNIT |
| 412 | TRANSMITTING UNIT |
| 414 | OTHER UNITS |

What is claimed is:

1. A method comprising:
communicatively coupling a set top box with one or more external devices, wherein said set top box operates in three operating modes including (i) an on-mode, (ii) a standby mode, and (iii) an off mode;
detecting that the set top box is in standby mode; and
in response to detecting the standby mode of the set top box, selectively toggling an audio decoder of the set top box to an ON state such that the audio decoder is configured to decode at least one audio content received from at least one content source.

2. The method of claim 1, wherein detecting the standby mode of the set top box comprises:
detecting the standby mode of the set top box in response to receiving an input from an external device of the one or more external devices, wherein the input is indicative of a soft press of a power button of the external device.

3. The method of claim 1,
wherein the one or more external devices includes a television set, and
wherein detecting the standby mode of the set top box comprises:
detecting the standby mode of the set top box in response to receiving at least one input indicative of one of (i) a standby state of the television set, and (ii) a power OFF state of the television set.

4. The method of claim 1, further comprising:
receiving at least one input for playback of the at least one audio content; and
retrieving the at least one audio content from the at least one content source
decoding the retrieved at least one audio content using the audio decoder to enable playback of the decoded at least one audio content.

5. The method of claim 1, further comprising:
receiving at least one notification from the at least one content source;
synthesizing the at least one audio content corresponding to the at least one notification; and
decoding the at least one audio content using the audio decoder to enable playback of the at least one decoded audio content corresponding to the at least one notification.

6. The method of claim 4, wherein the at least one input comprises at least one voice command, and
wherein retrieving the at least one audio content from the at least one content source comprises:
converting the at least one voice command into at least one text string; and
searching for the at least one audio content in the at least one content source based on the at least one text string.

7. The method of claim 4, wherein the at least one input comprises at least one text command, and
wherein retrieving the at least one audio content from the at least one content source comprises:
searching for the at least one audio content in the at least one content source based on the at least one text command.

8. A set top box comprising:
a memory; and
at least one processor,
wherein the set top box is communicatively coupled with one or more external devices and operates in three operating modes including (i) an on-mode, (ii) a standby mode, and (iii) an off mode, and
wherein the at least one processor is configured to:
detect that the set top box is in the standby mode; and
in response to detecting the standby mode of the set top box, selectively toggle an audio decoder of the set top box to an ON state such that the audio decoder is configured to decode at least one audio content received from at least one content source.

9. The apparatus of claim 8, wherein the at least one processor is configured to detect the standby mode of the set top box in response to receiving an input from an external device of the one or more external devices, wherein the input is indicative of a soft press of a power button of the external device.

10. The apparatus of claim 8,
wherein the one or more external devices includes a television set, and
wherein the at least one processor is configured to detect the standby mode of the set top box in response to receiving at least one input indicative of one of (i) a standby state of the television set, and (ii) a power OFF state of the television set.

11. The apparatus of claim 8, wherein the at least one processor is further configured to:
receive at least one input for playback of the at least one audio content;
retrieve the at least one audio content from the at least one content source; and
enable playback of the at least one audio content in response to decoding of the retrieved at least one audio content using the audio decoder of the set top box.

12. The apparatus of claim 8, wherein the at least one processor is further configured to:
receive at least one notification from the at least one content source;
synthesize the at least one audio content corresponding to the at least one notification; and
enable playback of the at least one audio content corresponding to the at least one notification, in response to decoding of the at least one audio content using the audio decoder of the set top box.

13. The apparatus of claim 11, wherein the at least one input comprises at least one voice command, and
wherein the at least one processor is configured to retrieve the at least one audio content from the at least one content source by:
converting the at least one voice command into at least one text string; and
searching for the at least one audio content in the at least one content source based on the at least one text string.

14. The apparatus of claim 11, wherein the at least one input comprises at least one text command, and
wherein the at least one processor is configured to retrieve the at least one audio content from the at least one content source by:
searching for the at least one audio content in the at least one content source based on the at least one text command.

15. A system comprising:
a set-top box communicatively coupled with one or more external devices, wherein said set top box operates in three operating modes including (i) an on-mode, (ii) a standby mode, and (iii) an off mode, said set-top box comprising:
an audio decoder; and
at least one processor operatively coupled with the audio decoder and configured to:
detect that the set-top box is in the standby mode; and
in response to detecting the standby mode of the set top box, selectively toggle the audio decoder to an ON state such that the audio decoder is configured to decode at least one audio content received from at least one content source; and
at least one input device operatively coupled with the at least one processor for transmitting at least one input for playback of the at least one audio content,
wherein the at least one processor is further configured to:
receive the at least one input for playback of the at least one audio content;

retrieve the at least one audio content from the at least one content source; and enable playback of the retrieved at least one audio content after decoding by the audio decoder.

16. The system of claim 15, wherein the at least one processor is configured to detect the standby mode of the set top box in response to receiving at least one input from the at least one input device, wherein the at least one input is indicative of a soft press of a power button of the at least one input device.

17. The system of claim 15, wherein the one or more external devices includes a television set, and wherein the at least one processor is configured to detect the standby mode of the set top box in response to receiving at least one input indicative of one of (i) a standby state of the television set operatively coupled with the set top box, and (ii) a power OFF state of the television set.

18. The system of claim 15, wherein the at least one input for playback of the at least one audio content comprises at least one voice command, and wherein the at least one processor is configured to retrieve the at least one audio content from the at least one content source by:

converting the at least one voice command into at least one text string; and searching for the at least one audio content in the at least one content source based on the at least one text string.

19. The system of claim 15, wherein the at least one input for playback of the at least one audio content comprises at least one text command, and wherein the at least one processor is configured to retrieve the at least one audio content from the at least one content source by:

searching for the at least one audio content in the at least one content source based on the at least one text command.

20. The system of claim 15, wherein the at least one processor is configured to retrieve the at least one audio content from the at least one content source by:

forwarding the received at least one input to the at least one content source; and receiving the at least one audio content from the at least one content source.

21. A method comprising:

detecting a standby mode of a set top box;

selectively toggling an audio decoder of the set top box to an ON state in response to detecting the standby mode of the set top box;

receiving at least one notification from at least one content source;

synthesizing at least one audio content corresponding to the at least one notification; and decoding the at least one audio content using the audio decoder to enable playback of the at least one decoded audio content corresponding to the at least one notification.

22. An apparatus comprising:

a memory; and at least one processor configured to:

detect a standby mode of a set top box;

selectively toggle an audio decoder of the set top box to an ON state in response to detecting the standby mode of the set top box;

receive at least one notification from at least one content source;

synthesize at least one audio content corresponding to the at least one notification; and enable playback of the at least one audio content corresponding to the at least one notification, in response to decoding of the at least one audio content using the audio decoder of the set top box.

* * * * *